Jan. 13, 1931.  F. J. RAYBOULD  1,788,408
SCREW RETAINING DEVICE
Filed May 13, 1927
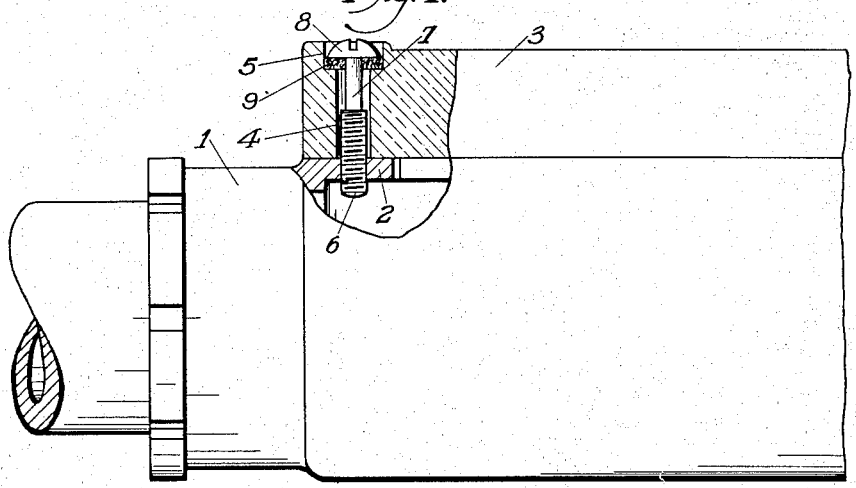
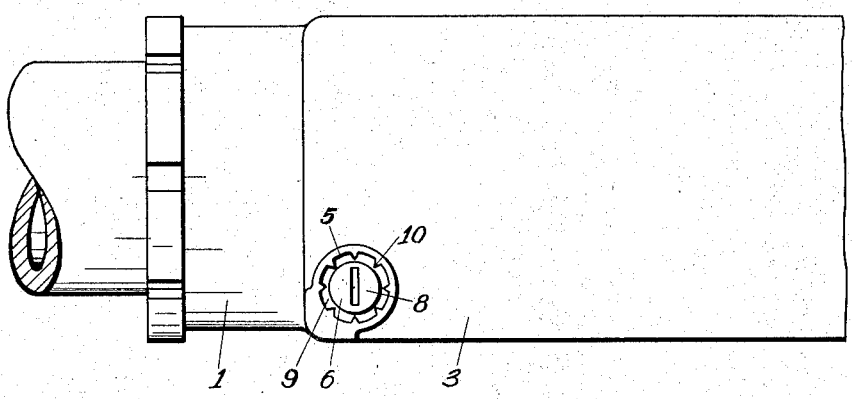
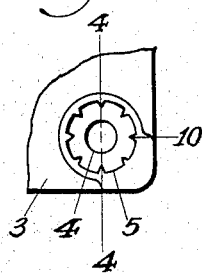
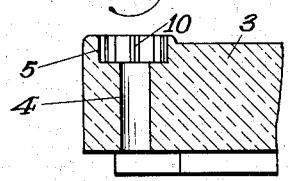
Frank J. Raybould
INVENTOR.
BY N. C. Lord
ATTORNEYS.

Patented Jan. 13, 1931

1,788,408

UNITED STATES PATENT OFFICE

FRANK J. RAYBOULD, OF ERIE, PENNSYLVANIA, ASSIGNOR TO ERIE MALLEABLE IRON COMPANY, OF ERIE, PENNSYLVANIA, A CORPORATION OF PENNSYLVANIA

SCREW-RETAINING DEVICE

Application filed May 13, 1927. Serial No. 191,041.

It is desirable with container covers of certain types to associate the screws with which they are attached to the container with the cover itself both to assure the screws for assembling and to assist in the assembling. This invention is particularly directed to the improvement of porcelain bodies particularly in the form of covers and has for its purpose supplying a ready means by which the washers which are ordinarily used for retaining the screws may be secured with certainty in the cover and without injury to the cover. Features and details of the invention will appear from the specification and claims.

A preferable embodiment of the invention is illustrated in the accompanying drawings as follows:—

Fig. 1 shows a side elevation of a conduit box with a cover in place thereon.

Fig. 2 a plan view of the same.

Fig. 3 a plan view of one corner of the cover showing the screw socket construction.

Fig. 4 a section on the line 4—4 in Fig. 3.

Fig. 5 a plan view of the washer.

1 marks the conduit box, 2 an ear on the box containing a screw-threaded perforation for the screw, and 3 the cover.

The cover has a perforation 4 for receiving the screw, which perforation terminates in a socket 5. A screw 6 has a shank 7 of reduced size and a head 8 which is adapted to enter the socket 5.

A washer 9 is arranged in the socket under the head of the screw. The walls of the socket have axially extending serrations 10. The washer is preferably formed of fiber, or similar material and is initially of a size to form a comparatively loose fit within the walls of the socket outside of the serrations. When it is forced into the socket the washer is creased by the serrations, these causing a slight enlargement of the washer into engagement with the walls of the socket but not sufficient to break out the walls and also an engagement with the walls of the serrations, this engagement being subjected to spring pressure due to the resiliency of the washer so that with the drying out, or aging of the washer, there is still a gripping pressure between the washer and the walls of the socket. The perforation through the washer is less than the size of the screw 6 but readily receives the shank 7. The screw may be forced into place, or screwed into place and is held in place in the perforation by the washer so that it is asembled with the cover and held in place for assembly with the box.

What I claim as new is:—

1. In a screw retaining device, the combination of a body having a perforation therethrough terminating in a socket having a serrated wall; a screw in the perforation having a head in the socket; and a washer in the socket under the head of the screw engaging the serrated wall.

2. In a fastener retaining device, the combination of a body having a perforation therethrough terminating in a socket, said socket having a serrated wall; and a washer engaging said serrated wall and adapted to be seated in the bottom of the socket under a screw head.

In testimony whereof I have hereunto set my hand.

FRANK J. RAYBOULD.